United States Patent Office 2,927,719
Patented Mar. 8, 1960

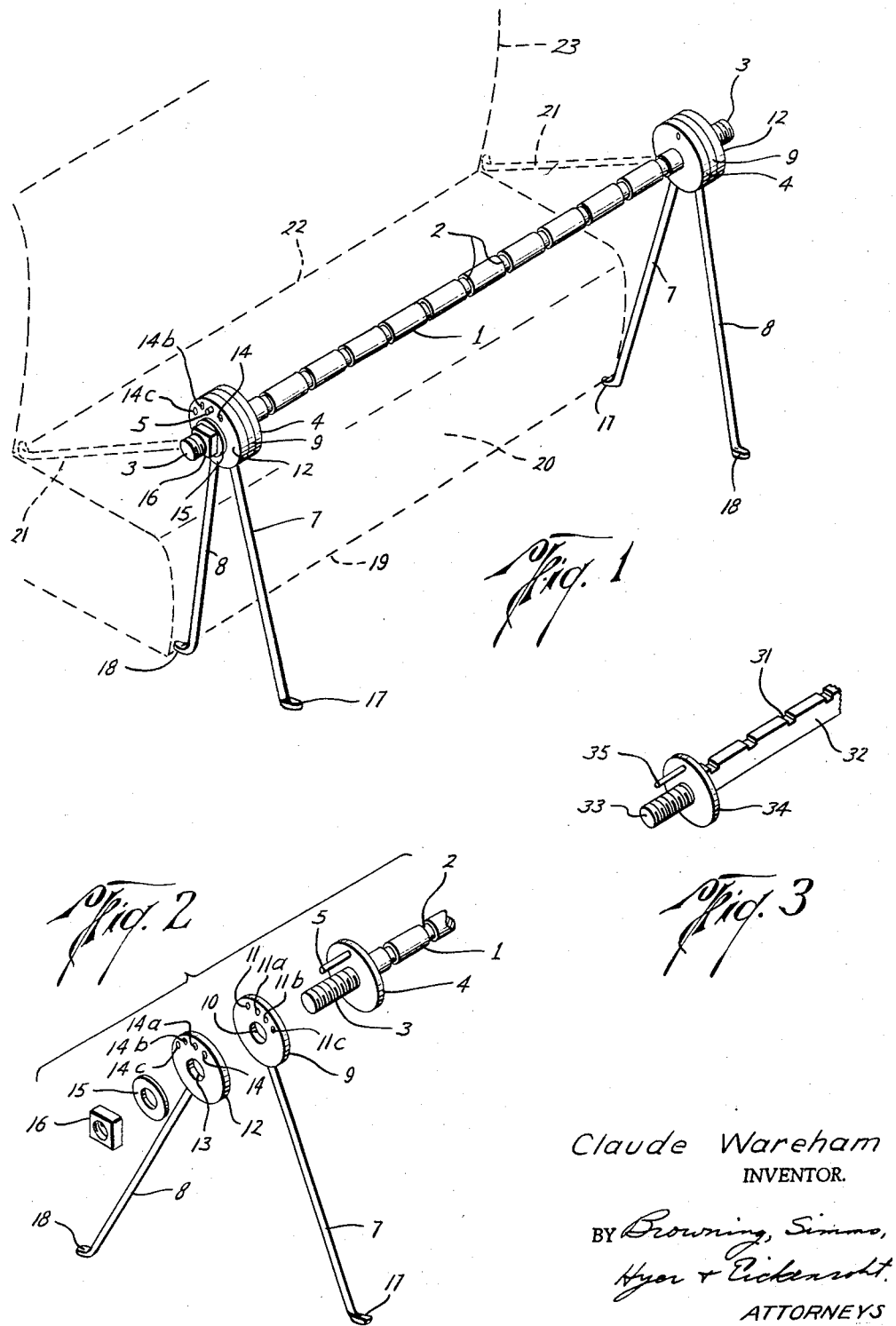

2,927,719
GARMENT RACK
Claude Wareham, Houston, Tex.
Application June 27, 1958, Serial No. 745,072
3 Claims. (Cl. 224—29)

This application relates to garment racks of the type adapted for use in various locations and specifically in the rear portion of the passenger compartment of an automobile.

Various means have heretofore been employed for the purpose of mounting a garment supporting bar or rack in the rear portion of an automobile for transporting garments on hangers. Some of these have been hung on the edges of the window glass at opposite sides of the automobile, with the obvious danger of breakage of such glass when loaded. Others have been hung on special brackets suspended from the top or side walls of the automobile but these required special attachment unless it just so happened that the automobile manufacturer provided a bracket intended for hanging a single garment hanger positioned in such fashion that it could be used to properly locate a bar extending across the entire width of the automobile. Even in the latter instance, such brackets are customarily provided with the strength required for suspending only two or three garments and are insufficient to provide adequate support for a large number of garments such as would be hung on a rack bar extending entirely across the automobile.

Various attempts have been made to provide rack bars with supports that would rest either on the seats or on the floor of an automobile, but the various automobile designs are so different in dimensions from each other that no standardization has been possible in such structures and it has been found necessary to manufacture each structure especially to fit a particular model and make of automobile with which it was intended to be used. Furthermore, there has been encountered a tendency when such structures are placed on the floor and supported on legs from the floor of a modern automobile, to permit the structure to tilt to the rear or to the front under acceleration or deceleration of the automobile because of the very narrow floor space available between the front and rear seats.

In view of the foregoing, it is an object of this invention to provide an automobile garment rack which will not require any special brackets or other means for attaching it to the automobile and which may be removed from or replaced in the automobile with the greatest of ease with no modification of the automobile whatsoever.

It is a further object of this invention to provide such a structure which may be readily adjusted to perfectly fit the requirements of any make or model of automobile without the necessity for any special tools to effect such an adjustment.

Another object of this invention is to provide such a structure which will not tilt either forwardly or rearwardly under acceleration or deceleration of the automobile.

Other objects and advantages of this invention will become apparent from the following description taken in connection with the accompanying drawings wherein is set forth by way of illustration and example certain embodiments of this invention.

In the drawings:

Fig. 1 is a perspective view of a garment rack constructed in accordance with this invention showing the same in place in front of the rear seat of an automobile and showing in dotted lines a second suitable position of adjustment for this location of the rack.

Fig. 2 is a fragmentary exploded perspective view illustrating the construction of the rack bar and legs of the device illustrated in Fig. 1 and specifically illustrating the means of mounting and adjustment of the legs on the rack bar.

Fig. 3 is a view similar to the right-hand portion of Fig. 2 illustrating a slightly modified form of rack bar.

Referring more particularly to the drawings, there is illustrated in Figs. 1 and 2 a rack bar 1 having notches 2 therein at intervals throughout its length, these being for the purpose of receiving the suspending hooks of garment hangers and preventing the garment hangers from sliding from end to end of the rack bar in the course of transportation. These notches in this form are illustrated as extending entirely around the rack bar 1, thereby making it immaterial which side of this rack bar is disposed upwardly and providing a rack bar in which, on specific desired adjustments of the legs, the legs might even be secured to a vertical support in suitable fashion at substantially right angles to the position in which they are shown in full lines in Fig. 1.

On either end of the bar 1 it is provided with a threaded section 3 extending from the end of the bar inwardly a suitable distance for the purpose hereinafter explained. At the inner end of this threaded section on each end of the bar 1 there is located a bearing flange 4 which extends radially in all directions from the bar and is preferably fixedly mounted on the bar, although it may be readily removable and only fixedly clamped on the bar in actual use. On this bearing flange 4 at each end of the bar there is provided a key or pin 5 eccentric with respect to the bar and extending from the flange 4 in a direction substantially parallel to the bar. Of course, this key might take other forms which will be readily apparent to persons skilled in the art, but in any event it should be in the form of a key extending toward the end of the bar from the flange 4, substantially rigidly fixed on the flange, and adapted to serve the purpose of fixing the angular adjustment of the legs with respect to the bar as will be presently described.

At each of its ends the bar is intended to be supported by a pair of legs 7 and 8. Each leg 7 is rigidly secured to or formed integral with a bearing plate 9 joined to the leg at the upper end of the leg, the leg being joined to the plate at one edge thereof so that both of the opposite faces of the plate will be left free. This plate is shown as being of the same size and shape approximately as the flange 4, although it will be appreciated that this is not critical and that all that is required is that it be complementary to the flange 4. It is provided with a central aperture 10 adapted to fit over the end of the shaft at 3, and with a series of angularly spaced apertures 11, 11a, 11b, and 11c, each adapted to engage with the key 5 so that the leg 7 may be placed over the end of the shaft 3 and then engaged with the key 5 in any one of a number of angularly adjusted positions. The face of the plate 9 which is closest to the flange 4 will be so formed as to fit against the flange 4 and when clamped thereagainst be held not only against angular movement by the engagement of the key 5 with one of the apertures 11, 11a, 11b or 11c, but also to be held against movement in any other direction by the face-to-face engagement of the plate 9 with the flange 4.

The other leg 8 of each pair is similarly provided with a bearing plate 12 which may be identical with the bearing plate 9 or which may not be so identical, but which should be adapted to fit against the bearing plate 9 in face-to-face engagement therewith so that by such engagement the leg 8 will be prevented from moving with respect to the plate 9 in any other direction except an angular direction about the common centers of the two plates. This plate 12 is provided with a central aperture 13 likewise adapted to engage over the end 3 of the rack bar and with a series of angularly disposed apertures 14, 14a 14b and 14c eccentrically disposed with respect to the central aperture 13. These apertures 14, 14a, 14b and 14c are adapted to be engaged with the key 5 as the plate 12 is slipped over the end of the shaft 3 after the plate 9 has been put in place thereon. Likewise, this key will be engaged with that one of the apertures 14, 14a, 14b and 14c which will secure the desired angular adjustment of the leg 8 with respect to the bar 1 and with respect to the leg 7.

In order to clamp these two legs on the ends of the bar so that they will be held rigidly in their adjusted positions on the bar, there is provided a washer 15 adapted to be slipped over the end of the bar after the plates 9 and 12 have been placed thereon in the desired adjusted positions, and a nut 16 adapted to be screwed onto the threaded end 3 of the bar on top of the washer 15. Obviously, tightening this nut will secure both legs 7 and 8 in the desired positions on the bar 1 and in the desired positions with respect to each other.

It is also noted that each leg 7 has a toe portion projecting laterally outwardly therefrom at its lower end as shown at 17 and that each leg 8 has a similar toe portion 18 projecting from its lower end in a laterally outward direction. The purpose of these toe portions is to enable them to extend under the adjacent edge portion of the seat of an automobile as shown in Fig. 1. Obviously, the other toe portions of the other legs could be extended under the adjacent portions of the front seat of an automobile in the same fashion, and thus the rack would be prevented from tilting either forwardly or rearwardly under acceleration or deceleration of the automobile.

In Fig. 1 the rear seat of an automobile is shown dotted in with its lower forward portion indicated at 19 and the toe portions 17 and 18 of the adjacent legs 7 and 8 engaged thereunder. This would obviously prevent the rack from tilting forwardly. The rear seat cushion extends upwardly from the edge 19 as shown at 20 and has its upper portion disposed in the usual fashion to receive passengers. In the event that the space between the front and rear seats of an automobile is found too narrow even to accommodate the rack constructed in accordance with this invention, the rack may, nevertheless, be mounted appropriately in the automobile by extending the adjustment of those legs 7 and 8 closest to the rear seat to the position illustrated by the dotted lines indicated by the numerals 21 in Fig. 1. In these positions the legs will rest upon the upper surface of the cushion and be supported thereby. Obviously, this will give a broad base to the rack and prevent its easy overturning. Furthermore, arrangements can be made so that the lower portions of these legs 7 and 8 which thus rest upon the seat cushion will engage in the crease 22 between the seat cushion and the back cushion of the rear seat, giving still further stability to the rack.

On reference to Fig. 3 it will be seen that a slightly modified form of bar 32 is provided with notches 31 on its upper surface only. This bar is provided with a bearing plate 34 on each end at the inner end of the threaded portion 33 thereof, the same as in the case of the bar 1, and the bearing plate 34 is likewise provided with a key 35 which may, if desired, be identical with the key 5 on the plate 4.

The operation of the form illustrated in Fig. 3 is identical to that shown in Fig. 1 with the exception that the position of this bar with respect to the vertical is somewhat more critical than that of the bar 1 since the notches 31 are in the upper surface thereof only. However, this is adequately taken care of by the mounting of the legs 7 and 8 in the fashion illustrated in Fig. 1 because by such mounting of the legs they can be adjusted with respect to the bar in such fashion that the notches 31 will always be upwardly.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A garment rack comprising a bar having notches in its outer surface throughout its length, a pair of legs extending laterally from and supporting each end of said bar, said legs each having a part engaging an end portion of said bar and said bar and each leg having interlocking parts eccentric to said bar for holding said legs in fixed angular adjustment with respect to said bar when clamped thereon, one of the interlocking parts being duplicated at arcuate intervals about said bar when the leg is positioned thereon to permit such interengagement for various adjustments of the angular position of each leg, and means for clamping each leg in selected angularly adjusted position on said bar.

2. A garment rack comprising a bar having notches in its outer surface throughout its length, a pair of legs extending laterally from and supporting each end of said bar, said legs each having a part engaging an end portion of said bar and said bar and each leg having interlocking parts eccentric to said bar for holding said legs in fixed angular adjustment with respect to said bar when clamped thereon, one of the interlocking parts being duplicated at arcuate intervals about said bar when the leg is positioned thereon to permit such interengagement for various adjustments of the angular position of each leg, and means for clamping each leg in selected angularly adjusted position on said bar, each of said legs having at its end remote from said engagement with said bar a laterally projecting toe portion adapted for engagement beneath a seat cushion or the like for holding the leg down and preventing accidental overturning of the rack.

3. A garment rack comprising a bar having notches in its outer surface at intervals throughout its length, a pair of legs extending laterally from and supporting each end of said bar, means for adjustably mounting said legs rigidly on the respective ends of said bar, said last means comprising a bearing flange fixed on said bar adjacent each end thereof and extending laterally from the bar, and a bearing plate on each of said legs complementary to said flange and to the bearing plate on the other leg of the same pair, each bearing plate having an edge portion secured to the end of its leg, said flange having a fixed key projecting therefrom toward the adjacent end of the bar and each of said bearing plates having a central aperture therein received on said bar and a series of apertures spaced along an arc about said central aperture to selectively receive said key, and means clamping the bearing plates of each pair of legs on one of the respective ends of said bar against the flange thereon and with a selected one of the arcuately arranged apertures of each plate engaged over the key on said flange.

References Cited in the file of this patent

UNITED STATES PATENTS

| | | |
|---|---|---|
| 933,650 | Kramer | Sept. 7, 1909 |
| 1,256,849 | Vaudreuil | Feb. 19, 1918 |
| 2,438,324 | Pfeffer | Mar. 23, 1948 |
| 2,583,244 | Underwood | Jan. 22, 1952 |
| 2,646,237 | Hinesman | July 21, 1953 |